United States Patent [19]

Heilman et al.

[11] Patent Number: 5,293,090

[45] Date of Patent: Mar. 8, 1994

[54] CENTRIFUGAL ACTUATOR ASSEMBLY

[75] Inventors: Ray Heilman, Florissant; Jeffrey Sherman, Maryland Heights, both of Mo.

[73] Assignee: Emerson Electric Co., St. Louis, Mo.

[21] Appl. No.: 21,158

[22] Filed: Feb. 19, 1993

[51] Int. Cl.⁵ .................. H02K 11/00; H01H 35/10
[52] U.S. Cl. .................. 310/68 E; 200/80 R
[58] Field of Search ............ 310/68 R, 68 E; 73/535, 73/536, 537, 539; 200/80 R, 329, 330, 336

[56] References Cited

U.S. PATENT DOCUMENTS

| | | | |
|---|---|---|---|
| 3,271,602 | 9/1966 | Waters | 310/68 E |
| 3,609,421 | 5/1970 | Hildebrandt | 310/68 E |
| 3,691,415 | 9/1972 | Hancock et al. | 310/68 E |
| 4,205,245 | 5/1980 | Hildebrandt et al. | 310/68 E |
| 4,208,559 | 6/1980 | Gray | 200/80 R |
| 4,242,607 | 12/1980 | Hildebrandt et al. | 310/68 E |
| 4,289,988 | 9/1981 | Schaefer | 310/68 E |
| 4,661,732 | 4/1987 | Gehrt | 310/68 E |
| 5,153,471 | 10/1992 | Ottersbach | 310/68 E |

*Primary Examiner*—Steven L. Stephan
*Assistant Examiner*—Matthew Nguyen
*Attorney, Agent, or Firm*—Polster, Lieder, Woodruff & Lucchesi

[57] ABSTRACT

A centrifugal actuator for mounting on a rotor shaft, the actuator being capable of movement from a first or start position to a second or run position, is provided having a base portion with a pair of opposed, mirror image actuator levers biased towards the first position. The levers are urged to the second position by centrifugal force when the shaft rotates. The levers are cooperatively connected to a sleeve, the sleeve being capable of axial movement allowing the sleeve to move from the first to second position in response to the movement of the levers. The sleeve has a collar and a shoulder portion for the seating of the actuator levers. Unique ramp structures extending from the sleeve collar to the seats on the shoulder cause the actuator levers to seat properly during assembly thereby allowing automated assembly and preventing field failure due to misseating of the actuator arms.

6 Claims, 3 Drawing Sheets

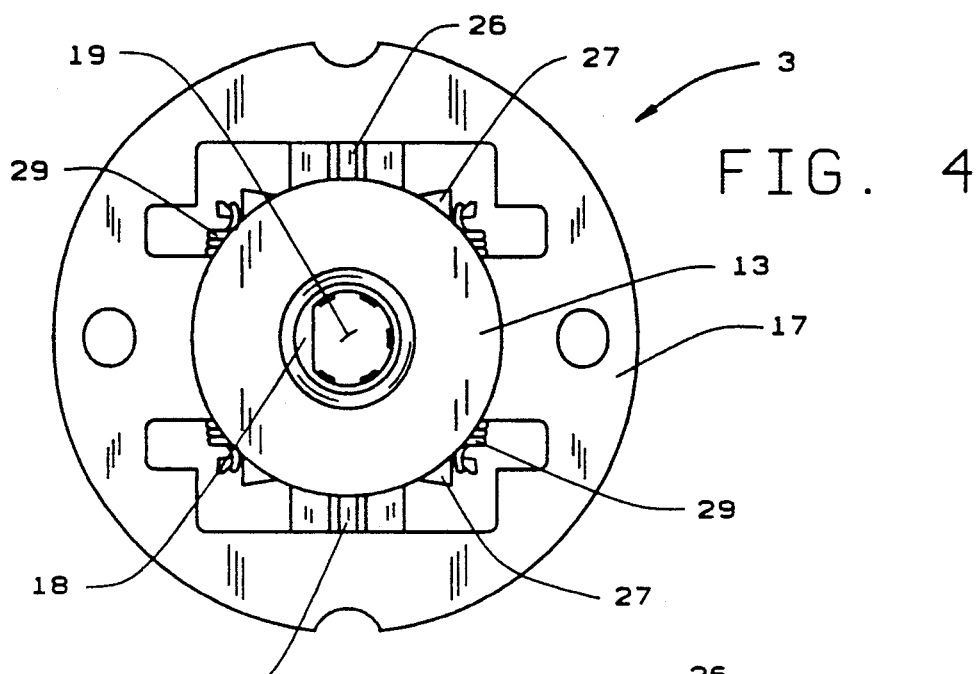
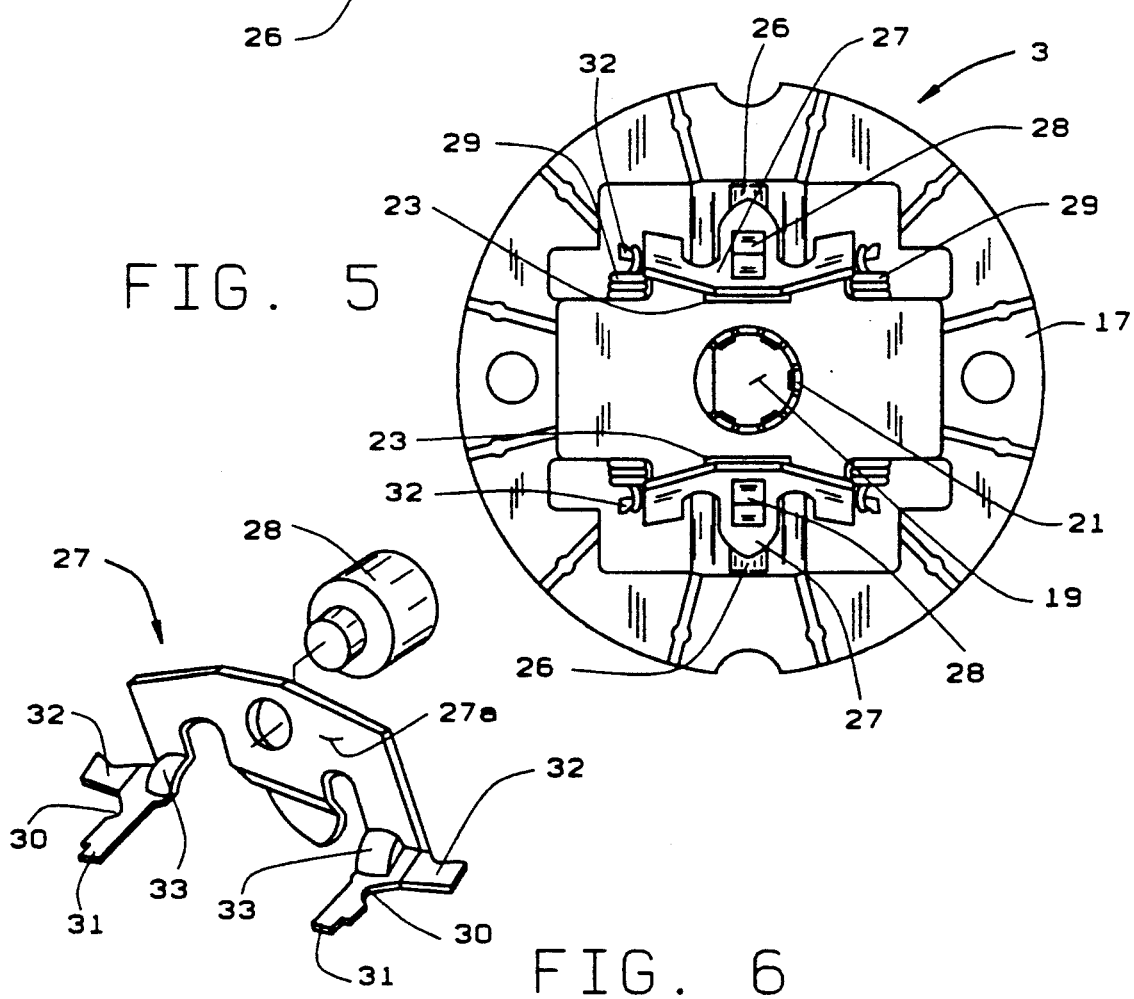

CENTRIFUGAL ACTUATOR ASSEMBLY

BACKGROUND OF THE INVENTION

This invention relates to electric motors or to other dynamoelectric machines, and more particularly, to an improved centrifugal actuator for actuating a motor starting switch which in turns controls energization of the starting winding in the motor in response to the speed of rotation of the motor.

In many conventional electric motors, such as single-phase induction motors, a rotating magnetic field is produced by means of a main winding and a starting winding included within the stator assembly of the motor. These windings are so designed and arranged within the motor that during start up of the motor, sufficient starting torque is obtained. Once the motor reaches a predetermined operational speed, a switch responsive to the rotational speed of the motor is opened to deenergize the starting winding. Upon the motor speed slowing below another predetermined speed of operation (e.g., due to load conditions or upon shut down of the motor) the switch is closed so that it will energize the starting winding of the motor.

As shown in U.S. Pat. Nos. 3,271,602 and 3,609,421, prior art centrifugal actuators are rotatable With a rotor shaft and include a centrifugal weight assembly, the latter including a pair of centrifugal weighted levers pivotally mounted on a sleeve. The sleeve, in turn, is mountable on the rotor shaft and is intended to be movable thereon. Upon the shaft rotating at a predetermined speed, the weights are thrown outwardly by centrifugal force thus causing the levers to pivot which in turn effects axial shifting movement of the sleeve of the centrifugal actuator with respect to the rotor shaft. This axial movement of the sleeve of the centrifugal actuator assembly in one direction from a so-called first or starting position to a second or run position upon acceleration of the motor to its predetermined operational speed effects the opening of a starting switch associated with the motor by relieving pressure on an actuator arm of the switch.

Typically, the sleeve of the centrifugal actuator, which is operated by the centrifugal levers, is moved along the shaft in a linear motion. The sleeve has a flat collar portion that engages the start switch to close the switch when the rotational speed of the rotor is not sufficient to overcome a biasing of force exerted on the levers. The centrifugal levers are resiliently biased toward their starting position by means of bias springs.

Centrifugal actuators known to the prior art are also disclosed in U.S. Pat. Nos. 4,242,607, and 4,205,245 to Hildebrandt et al. and U.S. Pat. No. 4,661,732 to Gerht. With many of the centrifugal actuators known to the prior art, typically the levers are formed of metal and have centrifugal weight attached to a portion thereof. The levers are pivotally connected to the actuator sleeve. Generally the lever is formed with leg portions extending outward from the weight bearing portion. The leg portions of the levers straddle an outwardly extending shoulder segment of the main body of the sleeve with the tips of the leg portions pivotally seated in notches or slots or other seating means formed in the shoulder portion of the sleeve member. During the assembly of these centrifugal actuators, the centrifugal levers are placed, legs up, on an assembly fixture. The sleeve is assembled onto a base and placed over the upwardly positioned lever legs. The bias springs are applied and the ends of the levers are manually inserted in the lever seats on each side of the sleeve. Prior art designs of the sleeve require that the seating of the levers be done manually to ensure that the leg portions of the levers are properly seated in the lever seats. This is a time consuming and labor intensive process which does not lend itself to an automated assembly procedure. Furthermore, motors having actuators assembled this fashion do not always operate properly in the field because they sometimes have misassembled actuators.

It is, therefore, an object of the present invention to provide a centrifugal actuator having a sleeve with lead ramps extending upward to the lever seats so that the end portions of the lever legs slide up the ramps into the lever seats during assembly, thereby assuring proper seating of the levers in the sleeve portion.

Another object of the invention is to provide a centrifugal actuator assembly having a sleeve with mounting ramps leading to the lever leg seats so that the lever legs can slide into the seats without misaligning during assembly process thereby permitting automated assembly of the actuator.

Another object of the present invention is to provide a centrifugal actuator assembly in which the lever legs can be properly seated in the sleeve notches before field assembly thereby preventing failure and field returns.

SUMMARY OF THE INVENTION

In accordance with this invention, generally stated, a centrifugal actuator assembly for a dyanmoelectric machine having a stator assembly and a rotor assembly including a shaft is provided which includes a sleeve intended for mounting on the rotor shaft, either directly or through an associated base. The sleeve includes a collar and shoulder segments. The shoulder is formed with opposed seats for seating an end of at least one lever. The collar includes lead ramps for the opposed seat portions. The lead ramps guide the lever into position into the seats during assembly of the centrifugal actuator thereby avoiding misalignment and allowing automated assembly of the actuator components. In the preferred embodiment, the actuator includes a base member having a central hub with an axial opening therein. The base portion has a fan structure integrally formed with it. The sleeve is mounted for movement on the hub. The axial opening in the central hub permits mounting of the fan on the rotor shaft. A pair of levers are mounted between the sleeve and the base fan combination. The levers have bifurcated lever legs which are positioned in the seat portion of the sleeve.

BRIEF DESCRIPTION OF THE DRAWINGS

In the drawings.

FIG. 4 is a top plan view thereof;

FIG. 5 is a bottom plan thereof;

FIG. 6 is a perspective view of one actuator lever element of the present invention;

DESCRIPTION OF A PREFERRED EMBODIMENT

Figure 1:
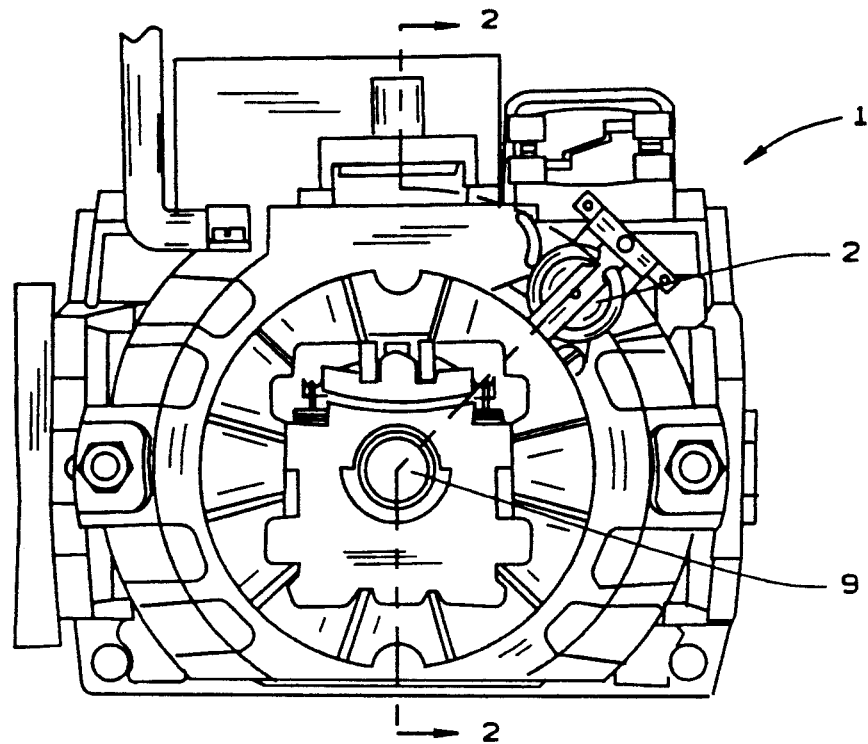
FIG. 1 is a front elevation view, partly broken away of a dynamoelectric machine of the type in which the centrifugal actuator assembly of the present invention is installed.

Referring now to FIG. 1, the reference numeral 1 indicates one illustrative embodiment of a dynamoelectric machine in the form of an induction motor in which the present invention finds application. Such a motor is intended to be used in a small appliance or power tool, for example. A centrifugal actuator assembly 3 of the present invention is designed to activate a starting switch arm as mounted in motor 1, generally indicated at reference numeral 2.

Figures 2, 3:
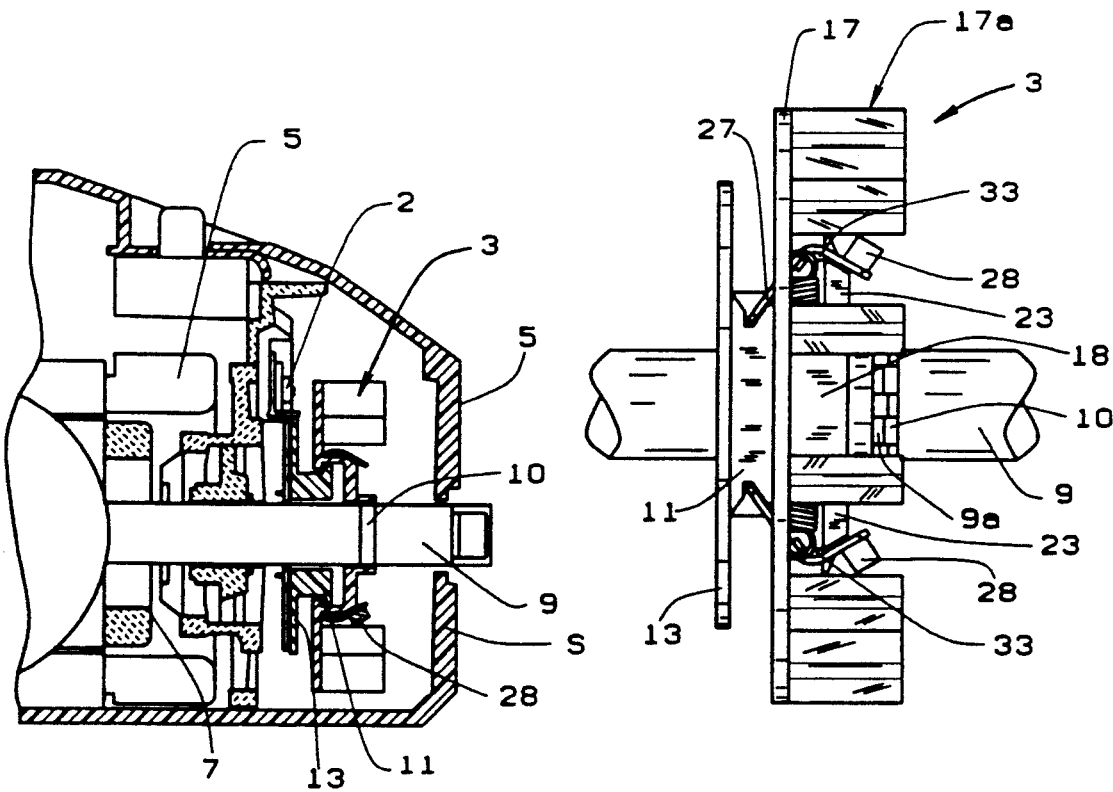
FIG. 2 is a sectional view, partly broken away, taken along lines 2—2 of FIG. 1, showing one illustrated embodiment of the acutator assembly of the present invention.
FIG. 3 is a side elevation of the centrifugal actuator assembly of the present invention.
Figure 7:
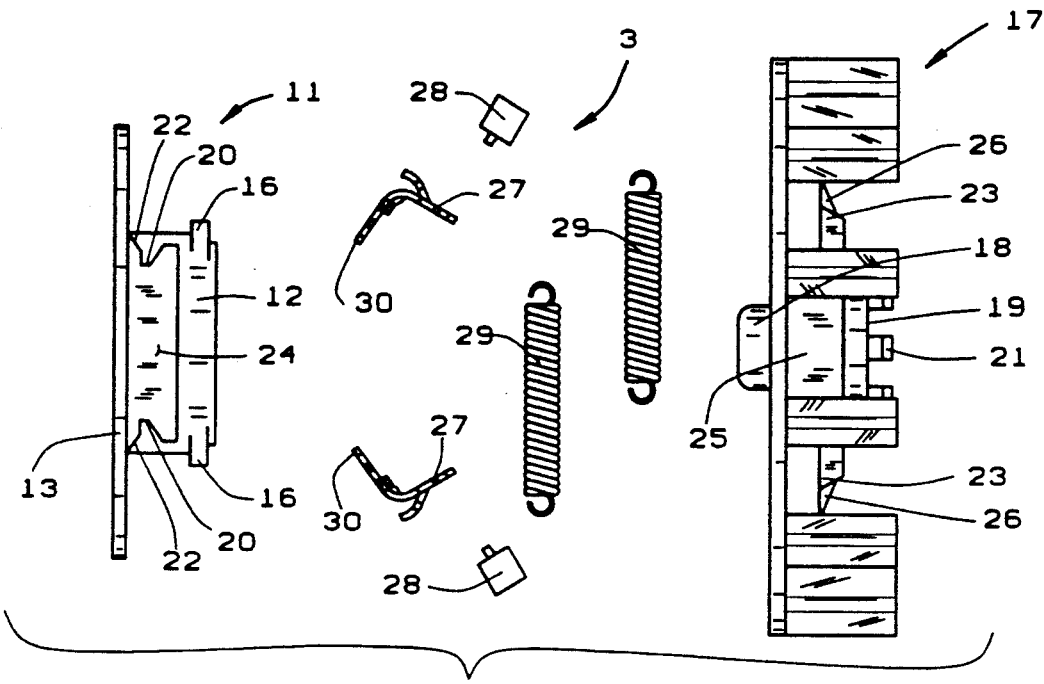
FIG. 7 is an exploded side elevation of the centrifugal actuator assembly of the present invention.

The operational position of the centrifugal actuator of the present invention is shown generally in FIG. 2. The motor 1 conventionally includes a stator assembly 5 and rotor assembly 7, with rotor assembly 7 mounted to a shaft 9. The shaft 9 is mounted for rotation with respect to the stator assembly 5 in a conventional manner. Shaft 9 extends through at least one end of an end shield S to provide mechanical output for the motor.

In accordance with this invention, centrifugal actuator assembly 3 includes a base 17 and a sleeve 11. Base 17, in this particular illustration includes an integrally formed fan 17a, is coupled to shaft 9 for rotation with the shaft 9. The base 17 includes a hub 18 having an axial opening 19 formed in it. Opening 19 permits the base to be mounted on the shaft 9. The hub 18 has sleeve 11 mounted thereon for axial movement with respect to the shaft. Sleeve 11 has a washer-shaped collar 13 extending outwardly from a shoulder 12. Shoulder 12 has a central opening 15 formed therethrough to permit sleeve 11 to fit over shaft 9 and hub 18. Sleeve 11 moves axially along hub 18 away from a switch arm 2 allowing the switch to open as centrifugal force causes levers 27 to move radially outward during rotation of the rotor 7. When rotor 7 is slowed or stopped, collar 13 is biased against switch arm 2 thereby closing the switch as will be further explained hereinafter.

Turning now to a more detailed description of the centrifugal actuator assembly 3 of the present invention shown in FIGS. 3-5, the base member 17 of assembly 3 may be formed from any appropriate material, such as high impact plastic, having hub 18 extending axially from sleeve seat 25 both having a keyed hole 19 formed therethrough for mounting over a shaft. As stated above, in these illustrations, base 17 is shown having blades 17a and designed as a fan in order to cool the windings. However, base 17 may be constructed without the associated fan structure, and such variations are intended to be with the scope of the invention.

A series of fingers 21 extending outwardly from around opening 19 serve to grasp a suitable groove 10 or other means formed o shaft 9 to secure the assembly 3 in place. Base 17 also has a pair of opposed, angled stops 23, 23, formed on each side of a sleeve seat 25 to position the actuator levers in an inward, biased position as will be explained below.

Turning now to FIGS. 3-7, the opposed actuators levers 27 are positioned to straddle sleeve seat 25 resting on stops 23 and are biased inwardly with bias means such as spring 29 in an arrangement generally known to the art. Each actuator lever 27 (FIG. 6) is conventional. It includes a body part 27a with weights 28 attached to body part 27a in a conventional manner and a pair of spring hooks 32 extend outwardly from body part 27a. A pair of spaced leg portions 30 with lever tips 31 extend outward from body part 27a with convex pivot members 33 in the angle formed by leg 30 and body 27.

Levers 27 are cooperatively connected to the movable sleeve 11 at lever seats 20 as will be further explained. During normal actuator operation, actuator levers 27 and the connected sleeve 11 are in a first or start position as shown in FIG. 3. As rotor shaft 9 accelerates to a preselected speed, weights 28 are forced outward by centrifugal force overcoming bias of springs 29. As levers 27 are drawn outwardly against the bias of spring 29, sleeve 11 is pulled back toward base 17 in a second or run position. In that position, sleeve 11 is disengaged from switch arm 2 (FIG. 1) allowing the switch to open, placing the motor in its run mode. As the motor decelerates to a preselected speed, bias springs 29 overcome the centrifugal force on weights 8 allowing the levers 27 to move to the first position against angled stops 23. Sleeve 11 moves axially along the hub 18 into abutment with switch arm 2 (FIG. 1) to close the switch.

Figure 8:
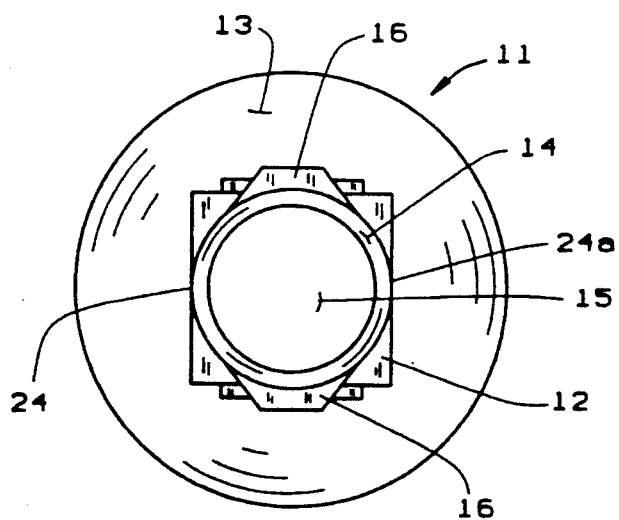
FIG. 8 is a top plan of the sleeve portion of the centrifugal actuator assembly of the present invention.
Figure 9:
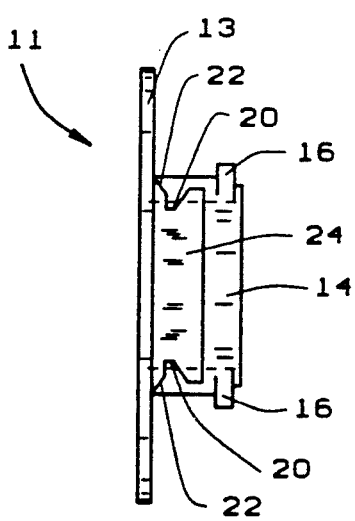
FIG. 9 is a side elevation of the sleeve portion of FIG. 8.

As stated above, levers 27 are cooperatively connected to sleeve 11 at lever seats 20. The unique construction of sleeve 11 allows for the proper seating of the lever tips 31 in seats 20 formed in the sleeve 11 as will now be explained, with FIGS. 7-9 best illustrating the design. Sleeve 11 is formed from any appropriate material such as high impact plastic. Sleeve 11 includes an axially extending shoulder 12 having the collar 13 extending radially outwardly therefrom. A rounded hub extension 14 with a pair of opposed lips 16 formed on opposite sides, extends normally from shoulder 12.

Shoulder 12 has a first side 24 and a second side 24a. Each side of shoulder 12 has a lever leg seat formed therein. This pair of seats 20 formed on each side of shoulder sides 24 and 24a are designed to seat lever tips 31 of actuator levers 27. Ramps 22 leading up from collar 13 to seat 20 allow the proper positioning of lever tips 31 in seats 20 during assembly. For example, when the actuator is assembled, the levers 27 are positioned on an assembly fixture (not shown) with legs 30 up. Shoulder 12 is inserted into sleeve seat 25 of base 17, sleeve 11 is rotated and ears 16 engage the back side of tabs 26 (FIGS. 4 and 5) formed on opposite sides of sleeve seat 25 to lock sleeve 11 within sleeve seat 25 and onto hub 18. Base 17, with sleeve 11 locked thereon, is positioned over the levers with the lever tips 31 resting on the face of collar 13 at the ends of ramps 22. When the bias springs are applied, the levers are drawn against rests 23, 23 and the lever tips 31 are moved up ramps 22 and into seats 20. This unique ramp configuration directs the lever tips 31 into seats 20 to prevent misalignment and actuator failure.

In view of the above it will be seen that the several objects of the invention are achieved and other advantageous results are obtained.

As various changes could be made in the above construction without departing from the scope of the invention, it is intended that all matter contained in the above description and shown in the accompanying drawings shall be interpreted as illustrative and not in a limiting sense.

What is claimed is:

1. In an electric motor having a stator assembly and a rotor assembly including a shaft, a starting winding, a starting switch for energizing and deenergizing the starting winding, a centrifugal actuator assembly rotatably mounted on the rotor shaft for actuating the starting winding, the centrifugal assembly having a base for mounting on the rotor shaft, a pair of actuating levers having mirror image legs mounted on the base, and a sleeve in slidable relationship with the rotor shaft having an annular collar at one end and a shoulder extending normally from the collar to provide seats for the legs of the acuator levers, the improvement in the sleeve comprising:

ramp means formed on the shoulder at the junction of the shoulder and the collar and extending from the collar to the seats to provide guides for the insertion of the lever legs in the seats during assembly.

2. A centrifugal actuator assembly adapted to be mounted on a rotatable shaft having a base with a hole formed therethrough for mounting on the rotatable shaft, a pair of actuating levers, each of said pair of levers having a pair of legs affixed to said base on opposite sides of the longitudinal axis of the shaft and being responsive to the rotation speed of said base creating movement of said levers between a first and second position upon acceleration and deceleration of the assembly and means for biasing said levers to said first position, the improvement comprising:

a sleeve slidably mounted on the shaft and having seat means formed thereon for seating said levers so that said levers can move said sleeve between a said first position and said second position, said sleeve having a shoulder with a collar extending radially therefrom, said sleeve having ramps formed between said collar and said seat means to facilitate the seating of the legs in the seat means during assembly of the actuator.

3. A centrifugal actuator assembly adapted to be mounted on a rotatable shaft comprising:

a base rotatably mounted on said shaft;

a pair of actuator levers on said base movably disposed relative to the longitudinal axis of said shaft responsive to the rotational speed of said actuator assembly on said shaft for actuating movement of said levers between a first and a second spaced positions relative to the longitudinal axis of said shaft upon acceleration and deceleration of said actuator assembly;

means for biasing said levers in said first position;

a sleeve mounted on said base and being movable axially relative to said longitudinal axis of said shaft, said sleeve having a shoulder portion and a collar portion, said shoulder portion having seats formed thereon to accept and seat said actuator levers so that said levers can move said sleeve means between a first and a second position during normal operation of acceleration and deceleration; and ramp means formed between said shoulder portion and said collar portion cooperatively connected to said seat means so as to seat said levers in said seat means properly during assembly of the centrifugal actuator.

4. The invention of claim 3 wherein each said lever is bifurcated and said sleeve has seats formed thereon to accept each of said bifurcated portions.

5. The invention of claim 3 wherein said base further comprises a fan structure formed thereon.

6. In an electric motor having a starting winding, a starting switch for energizing and deenergizing the starting winding, and a rotor shaft with a centrifugal actuator having a base rotatably mounted on said rotor shaft, a pair of actuating levers, each said lever having mirror-image bifurcated leg portions movably connecting a sleeve to the base, the sleeve being in a slidable relationship with the rotor shaft having a normally extending annular collar at one end thereof and a shoulder extending normally from said collar to provide seat means for the bifurcated leg portions of the actuating levers during normal pivotal actuator movement thereof, the improvement in the sleeve comprising:

ramp means formed on said shoulder between said collar and said seat means to provide guides for the insertion of said mirror-image leg portions of said actuating levers within said seat means during the assembly of said centrifugal actuator.

* * * * *

UNITED STATES PATENT AND TRADEMARK OFFICE
CERTIFICATE OF CORRECTION

PATENT NO. : 5,293,090
DATED : March 8, 1994
INVENTOR(S) : Heilman et al.

It is certified that error appears in the above-indentified patent and that said Letters Patent is hereby corrected as shown below:

```
Column 1, line 26, delete "With" and insert therefor
---with---;
Column 3, line 59, delete "o" and insert therefor
---on---;
```

Signed and Sealed this

Twenty-third Day of August, 1994

Attest:

BRUCE LEHMAN

*Attesting Officer*　　　　*Commissioner of Patents and Trademarks*